April 4, 1961    R. S. HAYWARD    2,978,281

THRUST BEARINGS

Filed Nov. 21, 1958

Inventor
R. S. HAYWARD
By
Holcombe Wetherill & Brisbois
Attorneys

United States Patent Office 2,978,281
Patented Apr. 4, 1961

2,978,281
THRUST BEARINGS
Ronald Sydney Hayward, Barking, England, assignor to Collaro Limited, Barking, England, a British company
Filed Nov. 21, 1958, Ser. No. 775,513
Claims priority, application Great Britain Nov. 25, 1957
3 Claims. (Cl. 308—227)

Gramophone turntables which are driven either on the rim or near the rim by a rotating wheel or roller commonly have a central bush which rotates on a fixed spigot. The weight of the turntable and of any record placed on the turntable is resisted by a thrust bearing which has two horizontal thrust surfaces one above the other and between which the thrust is transmitted. Usually, one thrust surface is on the underside of a washer surrounding the spigot and the thrust is transmitted to this surface from the turntable through a ball bearing on which the turntable rotates. The second thrust surface may be on a fixed annular shoulder around the spigot or it may be on the top face of another washer which rests on a fixed support.

If either of these thrust surfaces is not accurately flat or accurately at right angles to the axis of rotation, the turntable is subjected to a very slight lateral rocking movement as it rotates. This rocking movement is very small because it can only take place within the limit of the movements allowed by the clearance of the bush on the turntable around the spigot. It is however, sufficient to add considerably to the disturbance, known as "wow," in the sound reproduced from a record on the turntable.

To prevent or reduce this rocking movement, according to the present invention, the thrust bearing of a gramophone turntable having a central bush rotatably mounted on a fixed spigot comprises two horizontal thrust surfaces one above the other and a ring extending around the spigot and interposed between the two surfaces, the ring having two pairs of diametrically opposite projections angularly offset at right angles to each other, one pair of projections being in contact with one thrust surface and the other pair with the other thrust surface.

If the two thrust surfaces are not accurately parallel to each other and at right angles to the axis of rotation of the turntable, the ring will rock about two axes passing one through each pair of projections and no substantial moment will be transmitted to the turntable tending to cause it to rock laterally. In consequence, the clearance of the bush will remain substantially constant around the whole periphery of the spigot and the turntable itself will rotate around a fixed axis of rotation without any disturbance.

Preferably, the ring is a flat metal washer with one pair of projections on one face and the other pair on the other face, the projections having part spherical surfaces. The projections may most readily be formed on the washer by a pressing operation. The ring must, of course, be sufficiently stiff to prevent distortion when it is subjected to the thrust loads.

An example of a turntable in accordance with the invention is illustrated in the accompanying drawings, in which.

Figure 1:
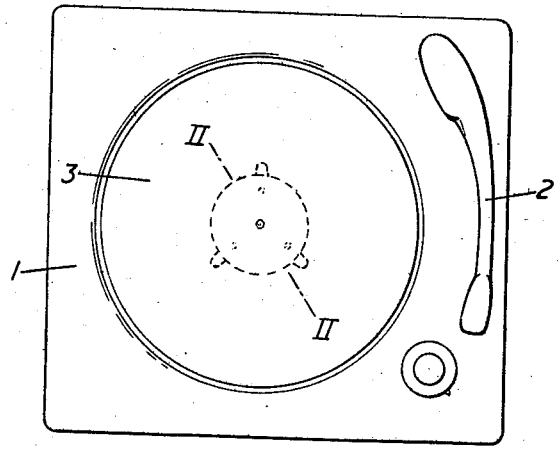
Figure 1 is a plan of a gramophone incorporating the turntable.
Figure 2:
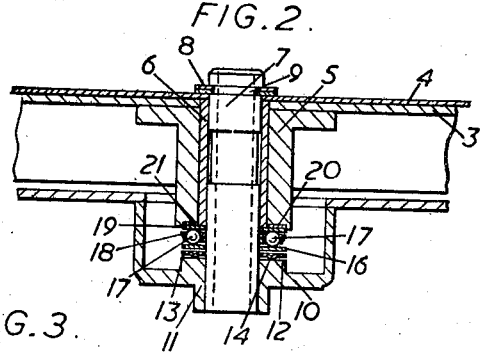
Figure 2 is a vertical section, on the line II—II in Figure 1, of part of the turntable shown to a larger scale.
Figure 3:
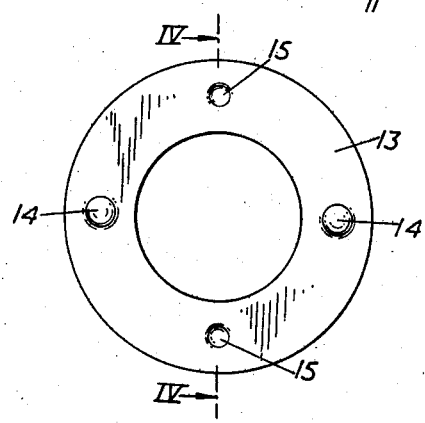
Figure 3 is a plan of the ring to a still larger scale.
Figure 4:
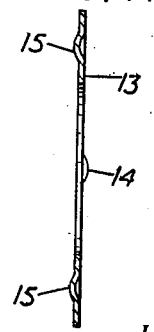
Figure 4 is a diametric section of the ring as seen in the direction of the arrows on the line IV—IV in Figure 3.

As shown in Figures 1 and 2, a gramophone has a base plate 1, a pick-up arm 2 and a turntable 3. The turntable 3 has a rubber covering mat 4 and a hollow central hub comprising a boss 5 encircling a phosphor-bronze bush 6. The phosphor-bronze bush 6 fits over a spigot 7 and the turntable is held in position by a clip 8 which fits in a groove 9 in the spigot 7. The spigot 7 is fixed in a mounting 10 which is in turn fixed to the underside of the base plate 1. The mounting 10 has an annular shoulder 11 surrounding the spigot 7. The top of the shoulder 11 has a flat horizontal surface 12 which forms the lower thrust surface. On the thrust surface 12 is a ring 13 which, as shown in detail in Figures 3 and 4, has two diametrically opposite projections 14 projecting from one face and two similar diametrically opposite projections 15 projecting from its other face. The projections 14 are in contact with the surface 12. On top of the ring 13 is a hardened steel washer 16. The underside of the washer 16 forms the upper thrust surface and is in contact with the projections 15 on the ring 13. Above the washer 16 is a ball bearing consisting of balls 17 held in a cage 18. Above this again is another washer 19 similar to the washer 16. Above the washer 19 is a rubber washer 20 which fits in a recess 21 in the lower surface of the central boss 5.

The turntable is driven by an electric motor which rotates a rubber roller which engages with the edge of the turntable. The driving mechanism is of a very well known kind and is not, therefore, illustrated.

In practice the thrust surface 12 and the surface of the recess 21, which are nominally parallel to each other, cannot both be made perfectly flat and accurately perpendicular to the axis of the spigot 7 and the washers 16, 19 and 20 may not have perfectly flat surfaces or exactly uniform thicknesses. There is, therefore, a tendency as the turntable is rotated by the driving mechanism for the turntable to be subjected to a very slight lateral rocking movement which is translated into a cyclical variation of the turntable speed. With the ring 13 in position, however, these inaccuracies only cause the ring 13 to rock to and fro on the projections 14 relatively to the surface 12 and the washer 16 to rock to and fro on the projections 15 in a direction at right angles to the rocking movement of the ring 13. This rocking movement of the washer 16 on which the turntable is carried compensates for the inaccuracies of the thrust surfaces and washers and the turntable is not, therefore, disturbed, so that any "wow" which might otherwise have been caused from this source is reduced or eliminated.

I claim:

1. In combination, a phonograph turntable and mounting therefor, said mounting comprising a fixed upwardly projecting spigot, means having a horizontal upwardly facing annular surface extending around the lower end of said spigot a hub rotatably mounted on said spigot above said upwardly facing horizontal surface, said hub being mounted centrally in and carrying said turntable, and being provided with a downwardly facing horizontal annular surface extending around the bottom end of said hub, an annular ball bearing and an annular ring and a washer extending around said spigot between said annular surfaces, said washer being interposed between said ring and ball bearing, and two pairs of diametrically opposite projections on said ring, said projections being spaced at 90 degree intervals around said ring, one of said pairs of projections protruding from said ring toward and into contact with said washer and the other pair of projections protruding in the opposite direction.

2. A phonograph turntable and mounting therefor as claimed in claim 1, wherein said ring is a flat washer, one of said pairs of diametrically opposite projections being on one face of said washer and the other pair of projections being on the other face of said washer.

3. A phonograph turntable and mounting therefor as claimed in claim 2, wherein said projections have part-spherical surfaces.

References Cited in the file of this patent

UNITED STATES PATENTS

| | | |
|---|---|---|
| 1,049,866 | Johnston | Jan. 7, 1913 |
| 1,320,836 | Brinkman | Nov. 4, 1919 |
| 1,746,068 | Barnes | Feb. 4, 1930 |
| 1,854,941 | Kiel | Apr. 19, 1932 |